(12) United States Patent
Snodgrass, Jr.

(10) Patent No.: US 6,463,836 B1
(45) Date of Patent: Oct. 15, 2002

(54) GUIDE FOR BAND SAWS

(76) Inventor: Howard L. Snodgrass, Jr., 1160 Fieldstone Rd., Watkinsville, GA (US) 30677

( * ) Notice: Subject to any disclaimer, the term of this patent is extended or adjusted under 35 U.S.C. 154(b) by 0 days.

(21) Appl. No.: 09/495,063

(22) Filed: Jan. 31, 2000

Related U.S. Application Data

(60) Provisional application No. 60/166,347, filed on Nov. 19, 1999, and provisional application No. 60/118,090, filed on Feb. 1, 1999.

(51) Int. Cl.$^7$ .............................................. B27B 13/10
(52) U.S. Cl. ............................................ 83/13; 83/825
(58) Field of Search .............................. 83/825, 820, 13

(56) References Cited

U.S. PATENT DOCUMENTS

| | | | | |
|---|---|---|---|---|
| 117,352 A | | 7/1871 | Wells ........................... 83/816 |
| 365,441 A | * | 6/1887 | Larsh ........................... 83/825 |
| 451,199 A | | 4/1891 | Kesseler ....................... 125/21 |
| 1,474,255 A | * | 11/1923 | Gillaspy ....................... 83/825 |
| 1,760,577 A | * | 5/1930 | Bishop ......................... 83/825 |
| 2,059,595 A | | 11/1936 | McKeage ..................... 83/820 |
| 2,152,906 A | * | 4/1939 | Miller .......................... 83/825 |
| 2,250,324 A | * | 7/1941 | Baker .......................... 83/825 |
| 2,601,095 A | * | 6/1952 | Crane ........................ 83/825 X |
| 2,850,053 A | | 9/1958 | Voss ............................ 83/824 |
| 2,986,181 A | * | 5/1961 | Carter ......................... 83/825 |
| 3,220,446 A | | 11/1965 | Burkey ........................ 83/168 |
| 3,461,764 A | | 8/1969 | Benith ......................... 83/807 |
| 3,643,536 A | | 2/1972 | Alexander ................... 83/820 |
| 4,179,966 A | | 12/1979 | Ginnow et al. .............. 83/820 |
| 4,189,968 A | | 2/1980 | Miranti, Jr. .................. 83/816 |
| 4,195,543 A | | 4/1980 | Tapply et al. ................ 83/794 |
| 4,258,601 A | | 3/1981 | Tanabe ........................ 83/820 |
| 4,920,846 A | * | 5/1990 | Duginske .................... 83/820 |
| 5,119,705 A | | 6/1992 | Rosenberger et al. ........ 83/162 |

* cited by examiner

Primary Examiner—Charles Goodman
(74) Attorney, Agent, or Firm—Webb Ziesenheim Logsdon Orkin & Hanson, P.C.

(57) ABSTRACT

A band saw blade guide for use with band saw blades, the band saw blade guide including a base, a wheel having a high-speed bearing and a circumferential groove, and a shaft movable with respect to the base. The groove receives a non-cutting edge of a band saw blade. The band saw blade guide is biased to be in constant contact with the non-cutting edge of the band saw blade.

18 Claims, 7 Drawing Sheets

GUIDE FOR BAND SAWS

CROSS REFERENCE TO RELATED APPLICATIONS

This application claims the benefit of earlier filed U.S. Provisional Patent Application Ser. No. 60/166,347, filed Nov. 19, 1999, entitled "Guide for Band Saws" and No. 60/118,090, filed Feb. 1, 1999, entitled "Guide for Band Saws".

BACKGROUND OF THE INVENTION

1. Field of the Invention

The present invention relates to band saw machines and, more particularly, to band saw blade guides.

2. Brief Description of the Prior Art

As shown in FIG. 1, a band saw machine A typically includes a frame B, a first pulley C, a second pulley D vertically aligned with the first pulley C, a horizontal table E positioned between the two pulleys C, D and perpendicular to a portion of the frame B, a continuous band saw blade F with a serrated edge G tensioned around both pulleys C, D, and a motor P driving either one of the pulleys C, D. As the motor P rotates the first or second pulley C, D in a given direction, the band saw blade F and the non-driven pulley (C or D) rotate in the same direction as the driven pulley (C or D). The rotation of the band saw blade F causes a serrated edge G of the band saw blade F to form a cutting edge. This cutting edge is used to cut a workpiece, such as wood or other suitable materials.

A well-known problem with band saw machines A is blade F movement during cutting. Despite the tension exerted on the band saw blade F by the pulleys C, D, the blade F has a certain degree of lateral, rearward, and torsional movement about a fixed vertical axis V of the band saw blade F. The movement becomes more pronounced as a workpiece is brought in contact with the serrated edge G of the band saw blade F.

Band saw blade guides were developed to help limit movement of the blade during cutting and improve cutting precision. As shown in FIG. 1, band saw blade guides typically include a first thrust bearing H, a second thrust bearing I, a pair of first side guides J, J', and a pair of second side guides K, K'. Both thrust bearings H, I are generally rotatable discs. The side guides J, J', K, K', such as those shown in more detail in FIG. 2, are generally adjustable blocks Q or rotatable discs. The first thrust bearing H is positioned perpendicular to a rear, non-cutting edge L of the band saw blade F, between the table E and the first pulley C. The second thrust bearing I is positioned perpendicular to the non-cutting edge L of the band saw blade F, between the table E and the second pulley D. Each pair of side guides J, J', K, K', is attached to the frame B or table E of the band saw machine A by a mounting bracket M. The blocks Q or discs are positioned opposite each side of the band saw blade F and parallel to one another, with one block on a first side N of the band saw blade F and one guide on a second side O of the band saw blade F. The first set of side guides J, J' is positioned between the first thrust bearing H and the table E, and the second set of side guides K, K' is positioned between the second thrust bearing I and the second pulley D. Both of the thrust bearings H, I and the side guides J, J', K, K' are adjustably spaced away from the non-cutting edge L, the first side N, and the second side O of the band saw blade F, and do not touch any portion of the band saw blade F until a workpiece is brought in contact with the band saw blade F.

In operation, a workpiece is brought in contact with the serrated edge G of the band saw blade F. As the workpiece is pressed against the rotating serrated edge G in a cutting position, the band saw blade F is pushed in a rearward direction Z (shown extending into the page in FIG. 1) with respect to the fixed vertical axis V of the band saw blade (also shown in FIG. 1). The first and second thrust bearings H, I contact the non-cutting edge L of the band saw blade F, stopping the rearward direction Z of the blade F. Similarly, the first and second side guides J, J', K, K' contact the first and second sides N, O of the band saw blade F when the band saw blade F is subjected to horizontal movement or torsional rotation about the fixed vertical axis V of the band saw blade F.

A disadvantage of the prior art is that a total of six band saw blade guides, including two thrust bearings H, I and two pairs of side guides J, J', K, K', are generally required to prevent excessive band saw blade F movement. Another disadvantage is that the prior art guides prevent the serrated edge G of the band saw blade F from pivoting about the non-cutting edge L of the band saw blade F. Pivotal movement is advantageous when making non-linear cuts in a workpiece. A further disadvantage of the prior art is that friction between the blocks Q in the side guides J, J', K, K' and the blade F creates heat which decreases the operating life of the band saw blade F.

SUMMARY OF THE INVENTION

To obviate the disadvantages of the prior art, the present invention includes a band saw blade guide for use with a band saw blade having a cutting edge and a non-cutting edge. The band saw blade guide includes a shaft having a first end and a second end. A wheel is carried on a first end of the shaft, and the wheel includes a circumferential groove. A base is connected to the second end of the shaft. The shaft is moveable along its longitudinal axis with respect to the base, the wheel is rotatably moveable with respect to the shaft, and the wheel is positioned to exert a continuous biasing force on the non-cutting edge of the band saw blade without imparting appreciable heat and friction on the rotating blade. The circumferential groove formed by the wheel, designed particularly for use with $\frac{1}{16}$" through $\frac{1}{4}$" band saw blades, inhibits rearward, lateral, and torsional movement of the band saw blade while allowing the cutting edge of the band saw blade to pivot with respect to the non-cutting edge of the blade.

The band saw blade guide can be easily installed into a large variety of existing band saw blade machines, using existing prefabricated mounting cavities positioned adjacent the frame or mounting arms of the band saw machine. Moreover, the present invention eliminates two pairs of side guides and one thrust bearing.

In one method of guiding a band saw blade with a band saw blade guide, the band saw blade has a cutting edge and an opposite, non-cutting edge. The band saw blade guide includes a base and wheel which has a circumferential groove. The first preferred step is positioning the band saw blade guide adjacent the non-cutting edge of the band saw blade. The next step is aligning the circumferential groove in the wheel parallel to and centered on the non-cutting edge of the band saw blade. Once the groove is aligned, the next step is moving the wheel toward the non-cutting edge of the band saw blade, preferably by moving the base with respect to a mounting arm on the machine, until the non-cutting edge is seated within the groove of the wheel. Finally, the last step is moving the wheel a second time toward the non-cutting edge of the band saw blade, preferably 1/8", so that the non-cutting edge of the band saw blade is seated in the circumferential groove, is in constant contact with the non-cutting edge of the band saw blade, and exerts a constant biasing pressure on the non-cutting edge of the band saw blade.

In a second method, preferably used when there are first and second thrust bearings and first and second block guides installed on the band saw machine, the first step is to remove the existing first side guide before positioning a band saw blade guide according to the present invention adjacent the non-cutting edge of the band saw blade. The next step is opening the blocks on the existing second side guide so that they will not contact the band saw blade. Once the blocks are opened, the next step is pushing the first and second thrust bearings in a direction away from the non-cutting edge of the band saw blade, such as a rearward direction. The next step is installing the band saw blade guide in accordance with the first method, as discussed above. The last step is spacing the second thrust bearing away from the non-cutting edge of the band saw blade. The spacing is preferably 0.003".

These and other advantages of the present invention will be clarified in the Detailed Description of the Preferred Embodiments taken together with the attached drawings in which like reference numerals represent like elements throughout.

DETAILED DESCRIPTION OF THE PREFERRED EMBODIMENTS

Figure 1:
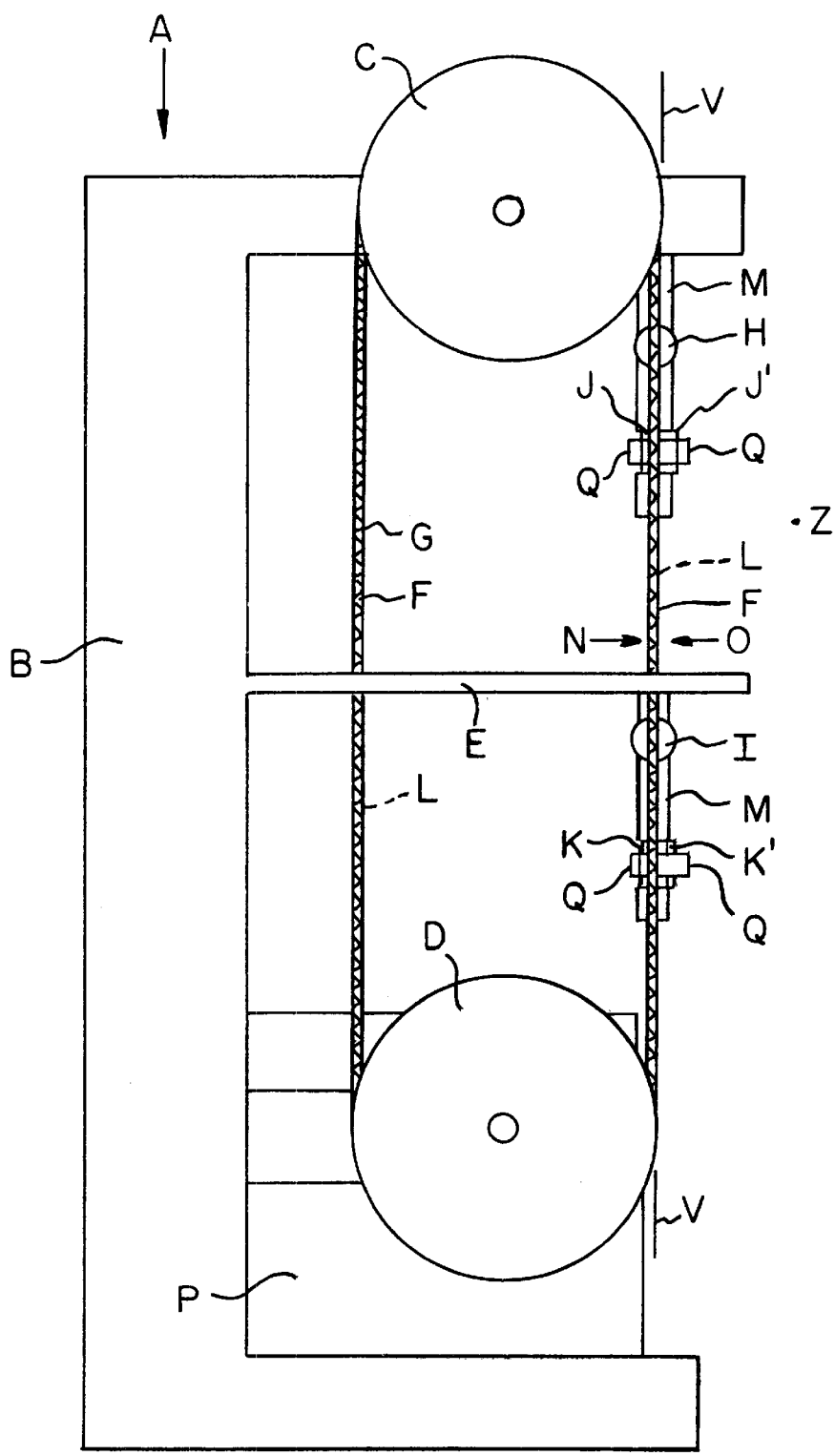
FIG. 1 is a front view of a prior art band saw machine, including prior art thrust bearings and side guides.
Figure 2:
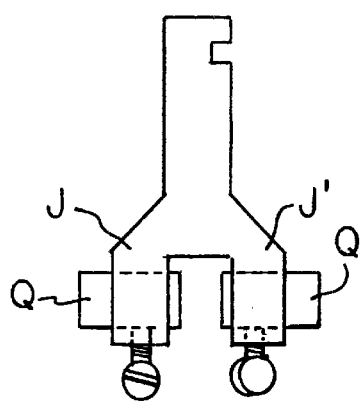
FIG. 2 is a top view of one of the prior art side guides shown in FIG. 1.
Figure 3:
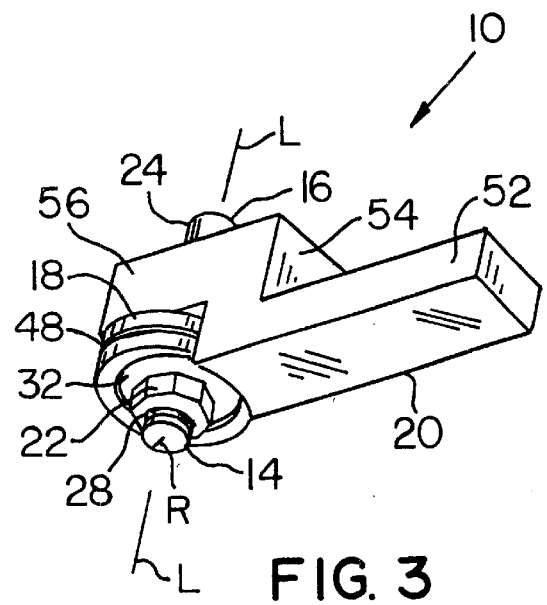
FIG. 3 is a perspective top view of a first embodiment band saw blade guide.
Figure 4:
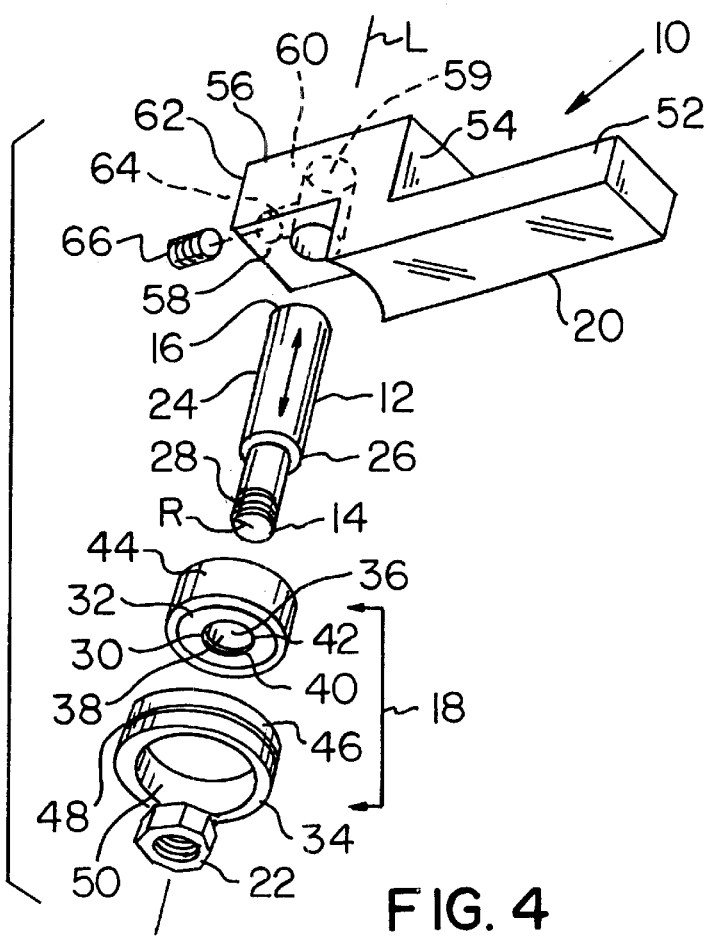
FIG. 4 is an exploded top perspective view of the band saw blade guide shown in FIG. 3.

As shown in FIGS. 3–4, one embodiment of the band saw blade guide 10 includes a shaft 12 having a first end 14 and a second end 16, a wheel 18 rotatably connected to the first end 14 of the shaft 12, a base 20, and a wheel retainer 22. The wheel 18 is rotatably connected to the first end 14 of the shaft 12, the second end 16 of the shaft 12 is moveably connected to the base 20, and the wheel retainer 22 is positioned adjacent the wheel 18 and the first end 14 of the shaft 12.

The shaft 12 is preferably cylindrical in shape, but further defines a flat surface 24. Moreover, the first end 14 of the shaft 12 has a smaller radius R than the second end 16 of the shaft 12, forming a ridge 26 between the first end 14 of the shaft 12 and the second end 16 of the shaft 12. The flat surface 24 extends along a longitudinal axis L, between the second end 16 of the shaft 12 and the ridge 26. The first end 14 of the shaft 12 includes threads 28 which extend along the first end 14 of the shaft 12, but do not extend to the ridge 26.

The wheel 18 is positioned adjacent the first end 14 of the shaft 12. The wheel 18 is defined by a race 30, a bearing 32, and a ring 34. The race 30 is a hollow cylinder forming a hollow center cavity 36, an inner shaft surface 38, and an inner bearing surface 40. The inner shaft surface 38 is positioned adjacent the first end 14 of the shaft 12 and is non-rotational with respect to the shaft 12.

The bearing 32 is a high-speed bearing 32, preferably rated at 30,000 rpm or higher. The bearing 32 has an inner race surface 42 and a bearing surface 44. The inner race surface 42 of the bearing 32 contacts the bearing surface 44 of the race 30. The inner race surface 42 of the bearing 32 is rotatable with respect to the shaft 12 and the inner bearing surface 40 of the race 30.

The ring 34 is preferably made from 64/66 carbon steel or other suitable material. The ring 34 has a hollow, cylindrical shape, an outer surface 46 forming a groove 48, and an inner surface 50. The inner surface 50 of the ring 34 is the same diameter as the bearing surface 44 of the bearing 32, and the ring 34 is pressed onto the bearing 32, forming a compression fit. The groove 48 extends circumferentially around the ring 34 and is preferably between 0.032" and 0.050" wide, and between 0.075" and 0.100" deep. The dimensions of the groove 48 are specifically suited for band saw blades 1/16" through 1/4". The wheel retainer 22, preferably a threaded locking nut, is threadedly attached to the first end 14 of the shaft 12.

Figure 5:
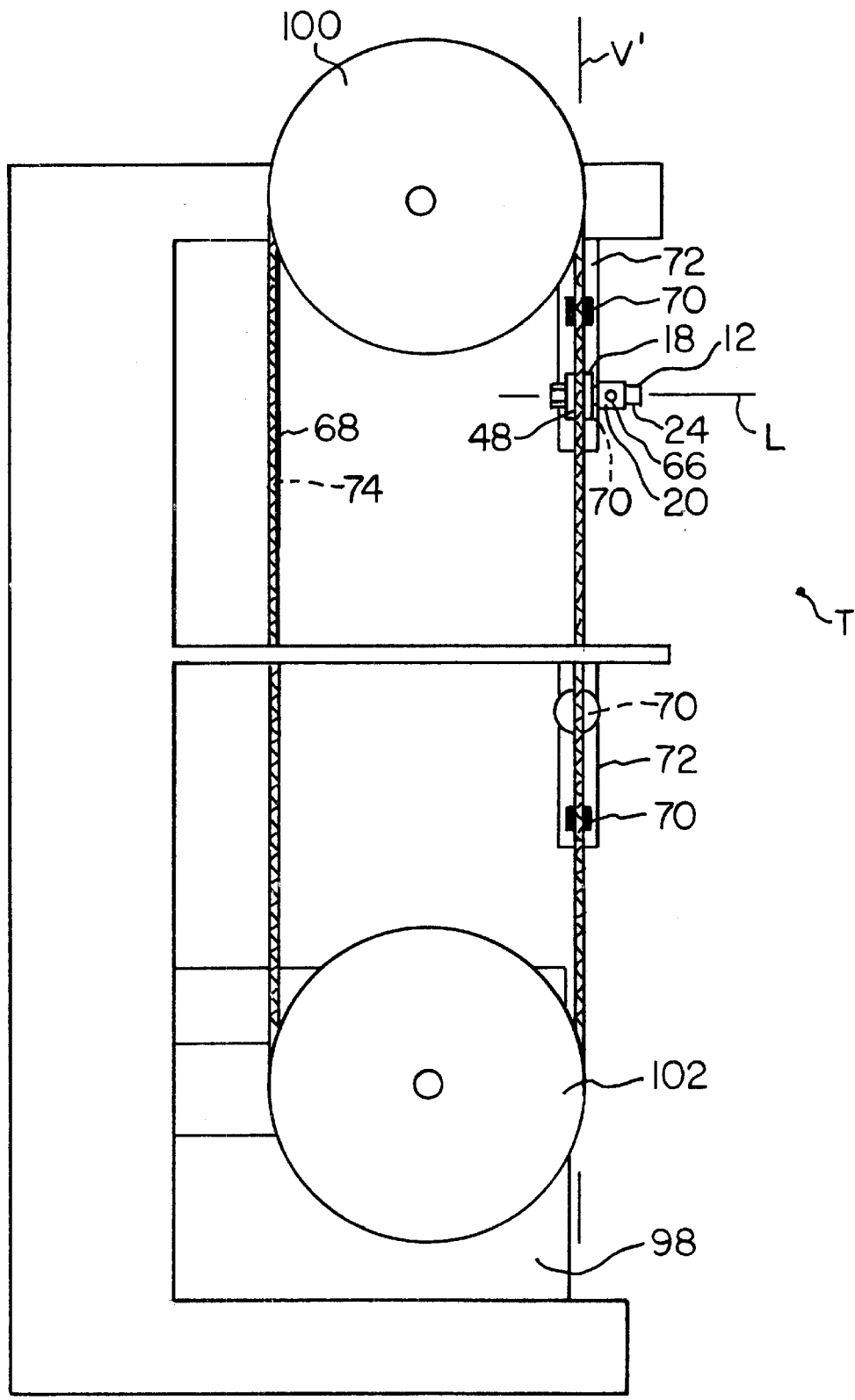
FIG. 5 is a front view of the band saw blade guide shown in FIGS. 3 and 4 installed in a band saw machine with an existing thrust bearing.

The base 20, shown in FIGS. 3–5, is a Z-shaped object when viewed from a top view, manufactured from metal or other suitable material. As shown in FIG. 4, the base 20 has a first arm 52, a second arm 54, and a third arm 56. The third arm 56 of the base 20 has a. first surface 58, a second surface 60, and a third surface 62. The third arm 56 forms a shaft cavity 59 that extends from the first surface 58 to the second surface 60 and further forms a screw cavity 64 extending from the third surface 62 to the shaft cavity 59.

The second end 16 of the shaft 12 is movable along its longitudinal axis in the shaft cavity 59 formed by the third arm 56 of the base 20, as indicated by the arrows. The first end 14 of the shaft 12 extends perpendicularly away from the first surface 58 of the third arm 56 and the second end 16 of the shaft 12 also preferably extends perpendicularly away from the second surface 60 of the third arm 56.

The screw cavity 64 formed by the third arm 56 receives a set screw 66. When the set screw 66 is inserted into the screw cavity 64 and tightened, the set screw 66 contacts the flat surface 24 of the shaft 12 and holds the shaft 12 in place. When the set screw 66 is loosened, the shaft 12 is slidably adjustable along the longitudinal shaft axis L, as shown in FIG. 3.

In operation, a band saw machine, shown in FIG. 5, is unplugged from a power source and a band saw blade 68, if installed, is removed. The first arm 52 of the base 20 is inserted into a prefabricated cavity 70 within the band saw machine frame or other guide holding device 72. After the band saw blade 68 is reinstalled and retensioned, the groove 48 in the wheel 18 is aligned parallel to and centered on a non-cutting edge 74 of the band saw blade 68 by loosening the set screw 66 and sliding the shaft 12 along the longitudinal shaft axis L. Once the groove 48 is aligned with and centered on the non-cutting edge 74 of the band saw blade 68, the set screw 66 is tightened on the flat surface 24 of the shaft 12, securing the shaft 12 in the base 20. The wheel 18 is then moved toward the non-cutting edge 74 of the band saw blade 68 (shown as exiting the page T), preferably by moving the base 20 in the same direction T until the non-cutting edge 74 of the band saw blade 68 is seated within the groove 48 of the wheel 18. After the non-cutting edge 74 of the band saw blade 68 is seated, the wheel 18 is moved another 1/8" toward the non-cutting edge 74 of the band saw blade 68, biasing the non-cutting edge 74 of the band saw blade 68 within the groove 48 of the wheel 18. The base 20 is then tightened within the prefabricated cavity 70 in the frame or other guide holding device 72 on the band saw machine, using conventional means, such as a set screw 66.

Figure 6:
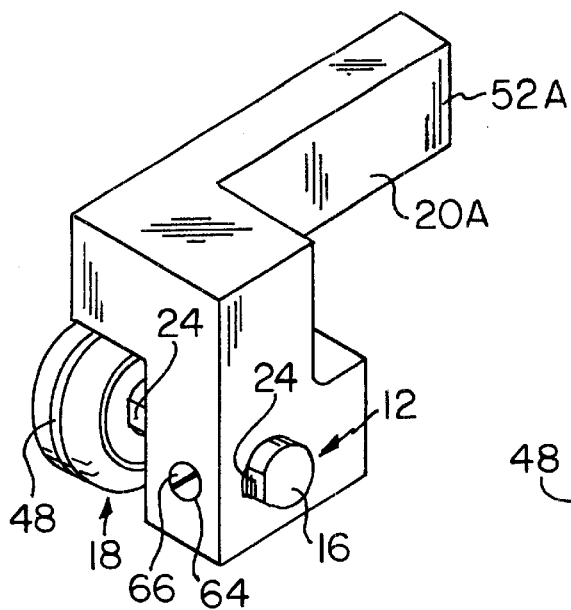
FIG. 6 is a top perspective view of a second embodiment of the present invention.
Figure 7:
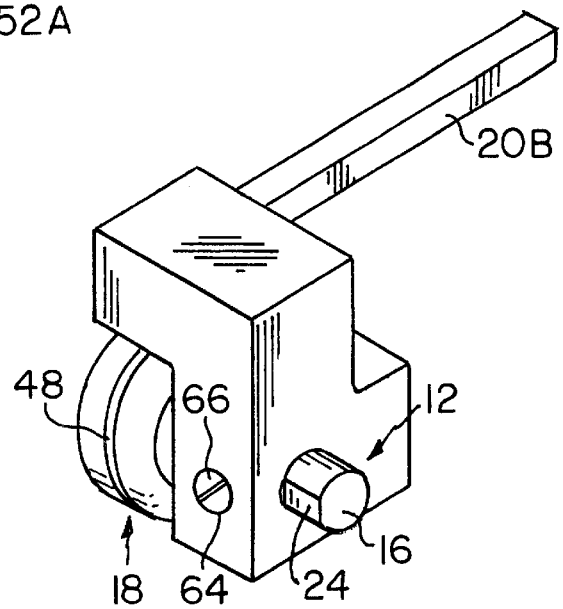
FIG. 7 is a top perspective view of a third embodiment of the present invention.
Figure 8:
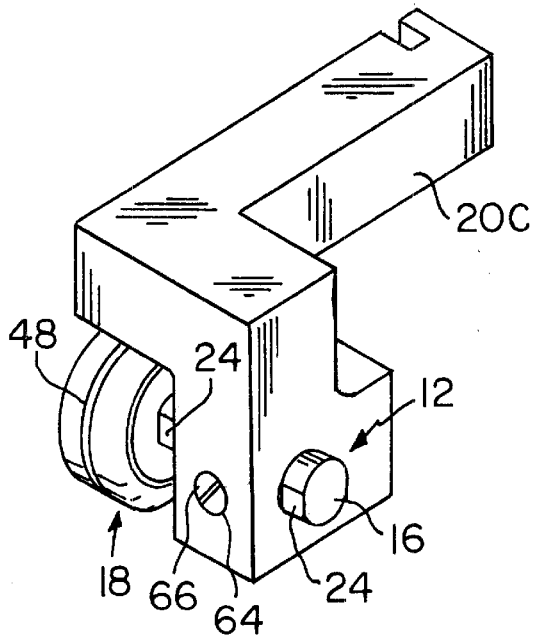
FIG. 8 is a top perspective view of a fourth embodiment of the present invention.
Figure 9:
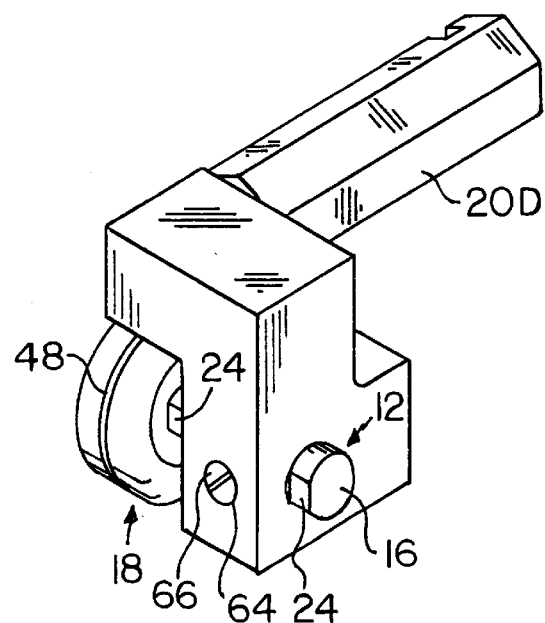
FIG. 9 is a top perspective view of a fifth embodiment of the present invention.
Figure 10:
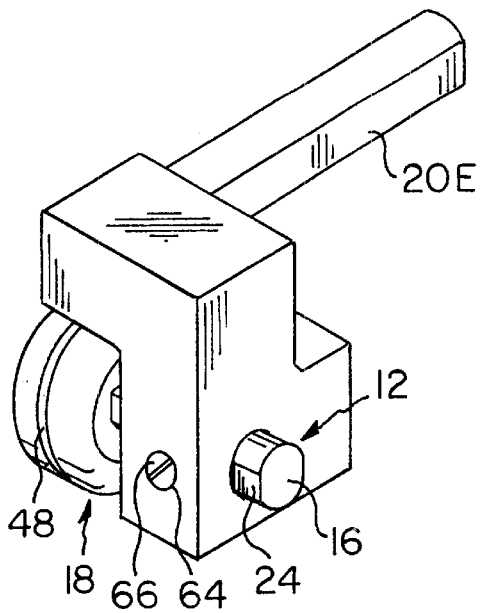
FIG. 10 is a top perspective view of a sixth embodiment of the present invention.
Figure 11:
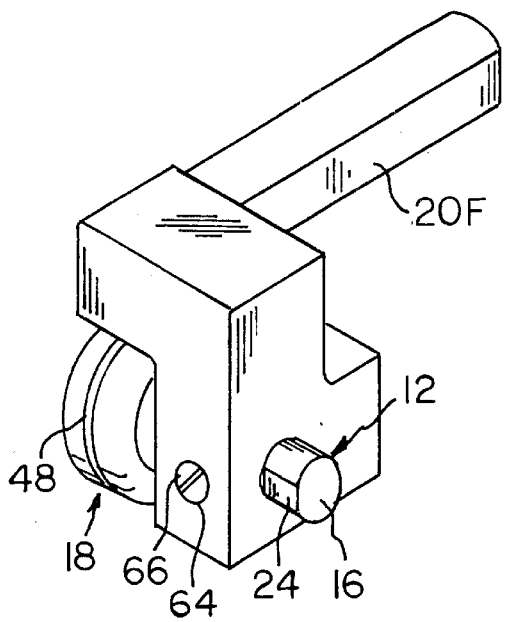
FIG. 11 is a top perspective view of a seventh embodiment of the present invention.
Figure 12:
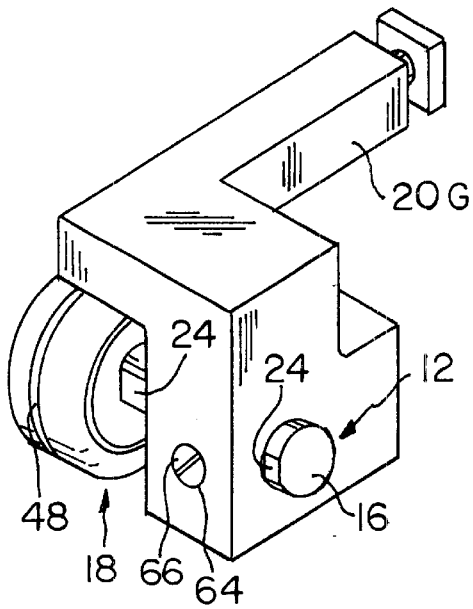
FIG. 12 is a top perspective view of an eighth embodiment of the present invention.
Figure 13:
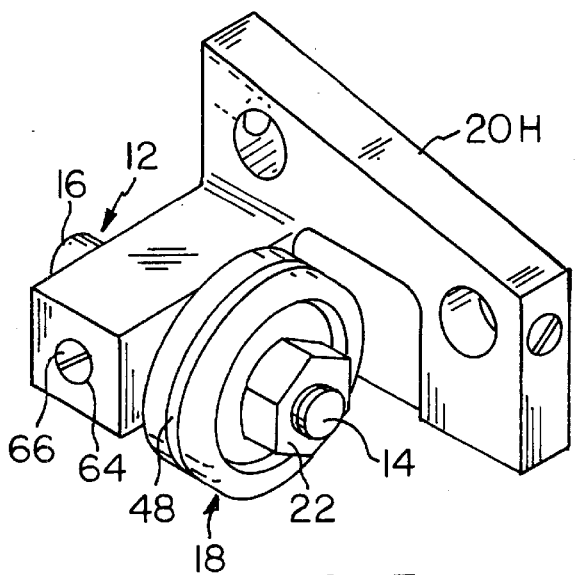
FIG. 13 is a top perspective view of a ninth embodiment of the present invention.
Figure 14:
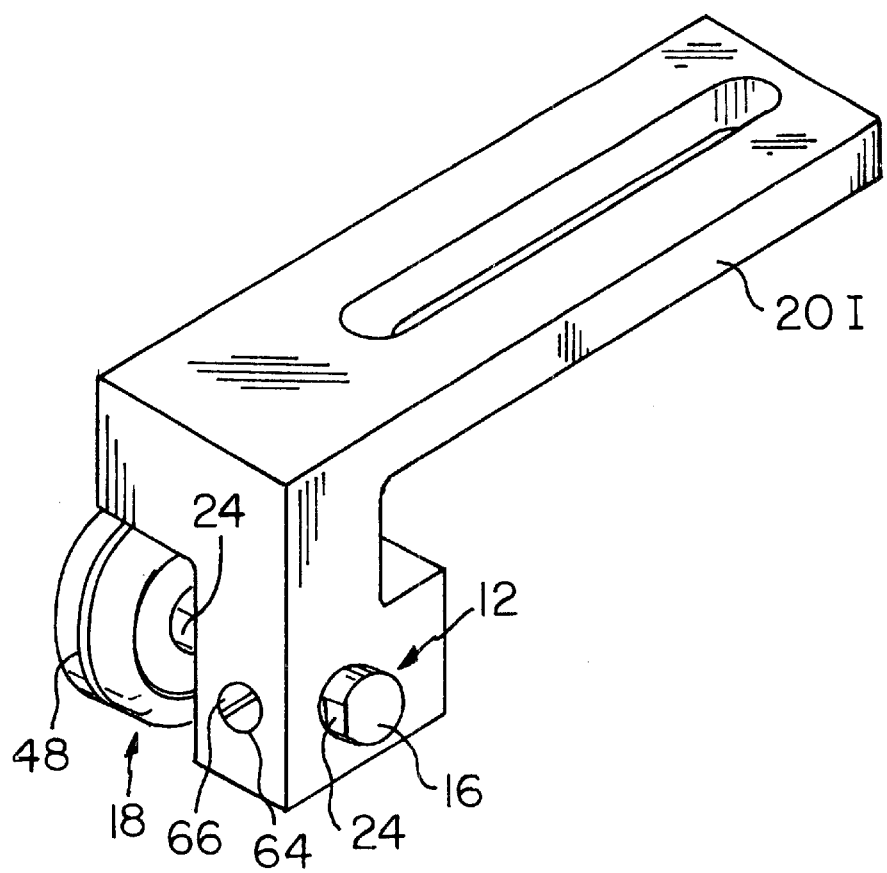
FIG. 14 is a top perspective view of a tenth embodiment of the present invention.
Figure 15:
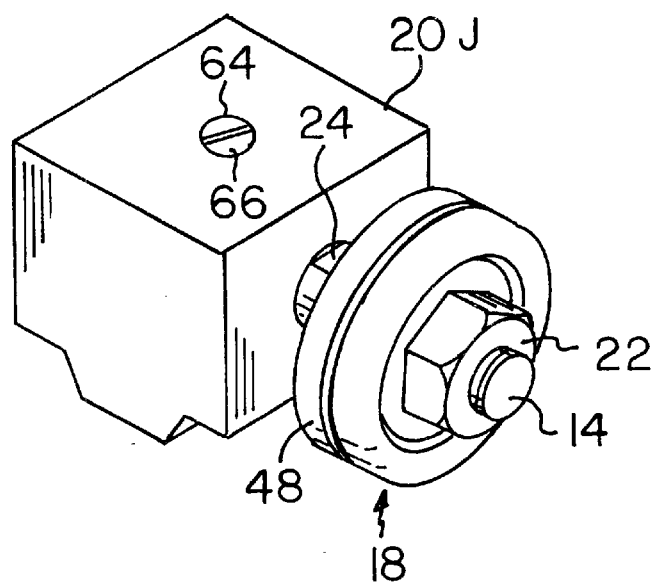
FIG. 15 is a top perspective view of an eleventh embodiment of the present invention.

It is understood that while the arms 52, 54, 56 of the base 20 shown in FIGS. 3–5 are preferably connected to form a single, continuous Z-shaped body when viewed from a top view, the base 20 can be configured in any fashion that positions the groove 48 in the wheel 18 in alignment with non-cutting edge 74 of the band saw blade 68. Moreover, it will be apparent to those skilled in the art that the base 20 may require different configurations depending on the band saw machine in which the invention is to be installed, such as an L-shape, a rectangle shape, or a square shape. By way of example only, and where like parts have the same reference numerals as the first embodiment, FIG. 6 shows a second embodiment having base 20A. Base 20A is L-shaped, when viewed from a top view. Base 20A is designed to fit most brands of band saws. FIG. 7 shows a third embodiment having base 20B. Base 20B is also L-shaped and fits most 9" and 10" saws. FIG. 8 shows a fourth embodiment having base 20C. Base 20C is also L-shaped and corresponds to SEARS brand band saws having hex-type, upper prefabricated cavities. FIG. 9 shows a fifth embodiment having base 20D, also L-shaped, corresponding to GRIZZLY brand 16" band saws. FIG. 10 shows a sixth embodiment having base 20E, also L-shaped, corresponding to POWERMATIC brand 14" band saws. FIG. 11 shows a seventh embodiment having base 20F, also L-shaped, corresponding to POWERMATIC brand 14" band saws. FIG. 12 shows an eighth embodiment having base 20G, also L-shaped, corresponding to SHOPSMITH brand band saws. FIG. 13 shows a ninth embodiment having base 20H, also L-shaped, corresponding to SEARS brand 12" band saws with two-pronged posts. FIG. 14 shows a tenth embodiment having base 20I with a rectangular shape when viewed from a top view, corresponding to DELTA brand 12" band saws. Finally, FIG. 15 shows an eleventh embodiment having base 20J, with a square shape, corresponding to LAGUNA TOOLS brand 16" band saws. However, these embodiments 20–20J are only illustrative and are not exhaustive. Each base 20A–20J embodiment, including the first base 20 embodiment, may be used in additional saw types, either in a modified or unmodified form. Moreover, as previously stated, the embodiments shown in FIGS. 3–15 are illustrative only, and other base configurations are clearly contemplated.

Figure 16:
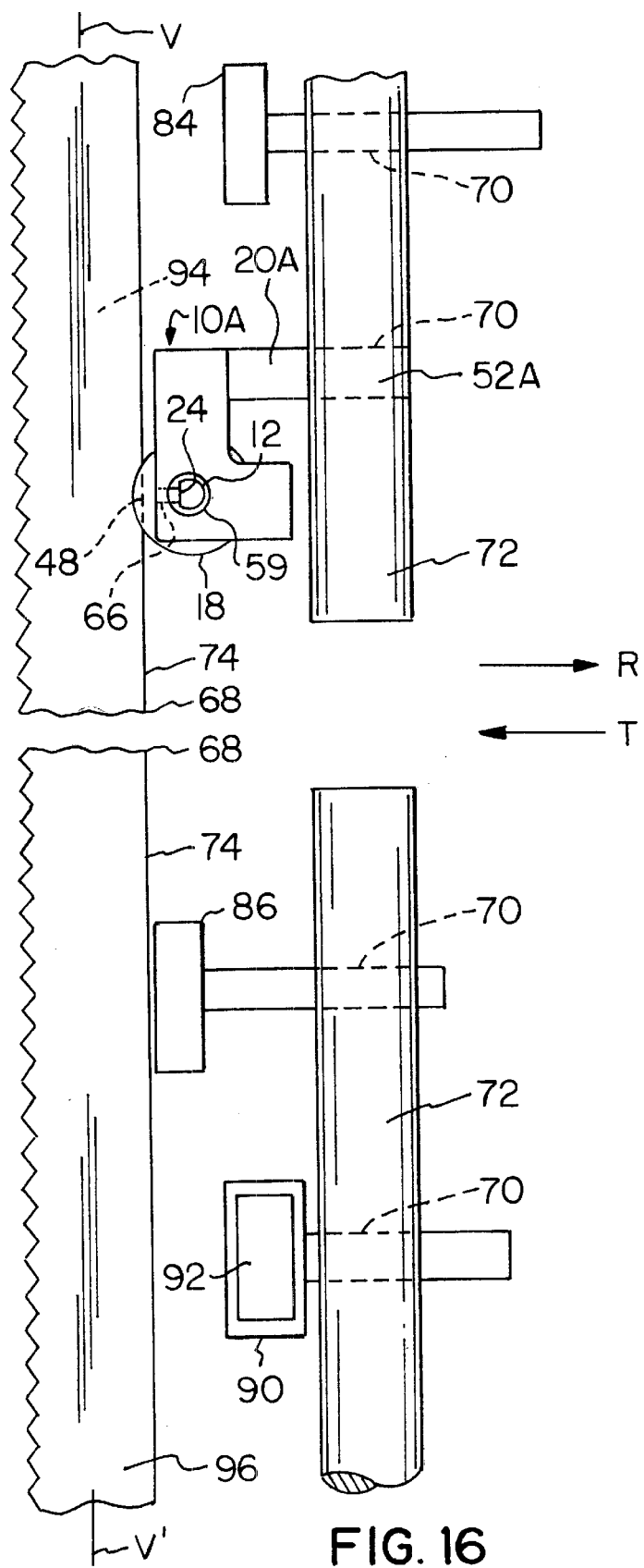
FIG. 16 is a side view of the second embodiment band saw blade guide shown in FIG. 6 installed in a mounting arm with pre-existing thrust bearings and side guides.

As shown in FIG. 16, the band saw machine may already have a first thrust bearing 84, a second thrust bearing 86, a first side guide (not shown), and a second side guide 90 installed. In this case, to install the invention, power is terminated to the band saw machine and the band saw blade 68, if installed, is removed. The first side guide (not shown) is loosened and removed from the prefabricated cavity 70 on or adjacent the band saw machine frame or guide holding device 72. Blocks 92 of the second side guide 90 are opened by pushing the blocks 92 away from first and second sides 94, 96 of the band saw blade 68 and tightening the blocks 92 in place.

The first and second thrust bearings 84, 86 are loosened and pushed in a rearward direction R, away from the non-cutting edge 74 of the band saw blade 68. The appropriate embodiment of the present invention is then installed in the same manner described above, with the second embodiment base 20A depicted in FIG. 16. This is accomplished by inserting the first end 52A of the base 20A into the prefabricated cavity 70 in the band saw machine frame or guide holding device 72 and reinstalling and retensioning the band saw blade 68. The groove 48 in the wheel 18 is aligned with the non-cutting edge 74 of the band saw blade 68, the non-cutting edge 74 of the band saw blade 68 is seated in the groove 48, the wheel 18 is then biased 1/8" in a forward direction T toward the non-cutting edge 74 of the band saw blade 68, and the base 20A is tightened in place. With the band saw blade guide 10A installed, the second thrust bearing 86 is then spaced away from the non-cutting edge 74 of the band saw blade 68 0.003", as shown in FIG. 16.

After an embodiment of the present invention has been installed on the band saw machine, such as the first embodiment shown in FIG. 5, the rotating band saw blade 68, driven by motor 98, causes the wheel 18 to turn in the same direction as pulleys 100, 102. Because the wheel 18 of the present invention is in constant contact with the non-cutting edge 74 of the band saw blade 68, the non-cutting edge 74 of the band saw blade 68 is restricted from moving in a rearward direction R during cutting. Moreover, lateral movement of the band saw blade 68, with respect to a fixed vertical axis V' running the length of the band saw blade 68, is restricted to the width of the groove 48. However, the cutting edge of the band saw blade 68 is still able to pivot about the non-cutting edge 74 of the band saw blade 68, allowing the band saw blade 68 to make circular or other desired cuts without tapering the cut.

The invention has been described with reference to the preferred embodiments. Obvious modifications and alterations will occur to others upon reading and understanding the preceding Detailed Description. It is intended that the invention be construed as including all such modifications and alterations insofar as they come within the scope of the appended claims.

I claim:

1. In a band saw having a band saw blade guide for use with a band saw blade, the band saw blade defining a cutting edge and a non-cutting edge, the improvement comprising:
   a shaft having a first end and a second end;
   a wheel having a high-speed bearing, the wheel positioned adjacent to the first end of the shaft and defining a circumferential groove on an outer surface thereof; and
   a base connected to the second end of the shaft, the shaft being fixed against rotation with respect to the base,
   wherein the wheel is positioned to be in continuous, rotational contact with the non-cutting edge of the band saw blade, the wheel exerts a continuous biasing force on the non-cutting edge of the band saw blade, and the cutting edge of the band saw blade can pivot with respect to the non-cutting edge of the band saw blade.

2. The band saw blade guide of claim 1 wherein the wheel includes a high-speed bearing.

3. The band saw blade guide of claim 2 wherein the high-speed bearing is operable at 30,000 revolutions per minute or higher.

4. The band saw blade guide of claim 2 wherein the circumferential groove is formed in a steel ring positioned adjacent and radially outward of the high-speed bearing, the steel ring compression-fitted onto a radially outward surface of the bearing.

5. The band saw blade guide of claim 1 wherein the circumferential groove has a width of between 0.032 inches and 0.050 inches.

6. The band saw blade guide of claim 1 wherein the circumferential groove has a depth of between 0.075 inches and 0.100 inches.

7. The band saw blade guide of claim 1 wherein the shaft has a first portion and a second portion of greater diameter than the first portion, the second portion having a flat area on an outer surface thereof.

8. The band saw blade guide of claim 7 wherein the base forms a screw cavity and a shaft cavity, with a set screw received in the screw cavity, and wherein the second end of the shaft is received by the shaft cavity, the set screw, when tightened against the flat area, restricting movement of the shaft with respect to the base.

9. The band saw blade guide of claim 1 wherein the base forms a shape selected from the group consisting of L-shape, Z-shape, rectangular shape, and cube shape.

10. The band saw blade guide of claim 1 further comprising means for retaining the wheel on the first end of the shaft.

11. A method of equipping a band saw having a band saw blade with a band saw blade guide, the band saw blade defining a cutting edge and an opposite non-cutting edge, and the band saw blade guide having a high-speed bearing and a wheel defining a circumferential groove, comprising the steps of:

a. positioning the band saw blade guide adjacent to the non-cutting edge of the band saw blade;

b. aligning the circumferential groove defined by the wheel with the non-cutting edge of the band saw blade;

c. moving the wheel toward the non-cutting edge of the band saw blade until the non-cutting edge of the band saw blade is in continuous, rotational contact with the non-cutting edge of the band saw blade guide;

d. further moving the wheel an appropriate amount toward the non-cutting edge of the band saw blade so that the wheel exerts a continuous biasing force against the non-cutting edge of the band saw blade; and e. fixing the location of the wheel.

12. The method of claim 11 wherein in step (d) the wheel is moved 1/8 inch.

13. The method of claim 11 further comprising the step of removing an existing first side guide on the band saw before the step of positioning the band saw blade guide adjacent the non-cutting edge of the band saw blade.

14. The method of claim 13 further comprising the step of opening blocks on an existing second side guide of the band saw after the step of removing the existing first side guide.

15. The method of claim 14 further comprising the step of pushing first and second thrust bearings on the band saw in a direction away from the non-cutting edge of the band saw blade after the step of opening the blocks on the existing second side guide.

16. The method of claim 11 further comprising the step of spacing the second thrust bearing 0.003" away from the non-cutting edge of the band saw blade after the step of moving the wheel the second time toward the non-cutting edge of the band saw blade.

17. A band saw, comprising:

a frame;

a pair of pulleys connected to the frame;

a mounting arm defining a cavity, the mounting arm connected to the frame;

a band saw blade connected to the pulleys so that rotation of the pulleys rotates the band saw blade, the band saw blade defining a cutting edge and a non-cutting edge;

a motor for rotating the pair of pulleys; and a band saw blade guide adjustably connected to the cavity defined by the mounting arm, the band saw blade guide having:

a shaft with a first end and a second end;

a wheel positioned adjacent to the first end of the shaft, the wheel having a high-speed bearing therein and defining a circumferential groove on an outer surface thereof;

a base forming a screw receiving cavity and a shaft receiving cavity, the shaft receiving cavity receiving the second end of the shaft and the screw receiving cavity receiving a set screw that selectively restricts movement of the shaft with respect to the base; and the groove on the wheel receiving the non-cutting edge of the band saw blade, wherein the wheel is in continuous, rotational contact with the non-cutting edge of the band saw blade when the band saw blade is in operation, the wheel exerts a continuous biasing force against the non-cutting edge of the band saw blade, and the cutting edge of the band saw blade is allowed to pivot with respect to the non-cutting edge of the band saw blade.

18. The band saw as claimed in claim 17 wherein the circumferential groove has a width of between 0.032 inches and 0.050 inches and a depth of between 0.075 inches and 0.100 inches.

* * * * *

UNITED STATES PATENT AND TRADEMARK OFFICE
CERTIFICATE OF CORRECTION

PATENT NO.   : 6,463,836 B1
DATED        : October 15, 2002
INVENTOR(S)  : Howard L. Snodgrass, Jr.

It is certified that error appears in the above-identified patent and that said Letters Patent is hereby corrected as shown below:

Column 4,
Line 3, "of. the" should read -- of the --
Line 49, "has a. first" should read -- has a first --

Column 6,
Line 27, "blade guide 1OA" should read -- blade guide 10A --.

Signed and Sealed this

Eleventh Day of March, 2003

JAMES E. ROGAN
*Director of the United States Patent and Trademark Office*